(12) United States Patent
Ekin

(10) Patent No.: US 11,049,197 B2
(45) Date of Patent: Jun. 29, 2021

(54) FULLY AUTOMATIC PIZZA, FLATBREAD, LAHMACUN ETC. PREPARATION AND DISTRIBUTION SYSTEM

(71) Applicant: Akif Ekin, Istanbul (TR)

(72) Inventor: Akif Ekin, Istanbul (TR)

(*) Notice: Subject to any disclaimer, the term of this patent is extended or adjusted under 35 U.S.C. 154(b) by 115 days.

(21) Appl. No.: 15/439,957

(22) Filed: Feb. 23, 2017

(65) Prior Publication Data
US 2018/0158153 A1   Jun. 7, 2018

(30) Foreign Application Priority Data
Dec. 7, 2016   (TR) .................. 2016/18011

(51) Int. Cl.
| | | |
|---|---|---|
| *G06Q 50/12* | (2012.01) | |
| *G06Q 30/06* | (2012.01) | |
| *G06Q 10/08* | (2012.01) | |
| *B60P 3/025* | (2006.01) | |
| *G05D 1/00* | (2006.01) | |
| *G05D 1/02* | (2020.01) | |

(Continued)

(52) U.S. Cl.
CPC .............. *G06Q 50/12* (2013.01); *A21B 1/52* (2013.01); *A21C 1/00* (2013.01); *B60P 3/0257* (2013.01); *G05D 1/0088* (2013.01); *G05D 1/0231* (2013.01); *G05D 1/0257* (2013.01); *G06Q 10/06315* (2013.01); *G06Q 10/083* (2013.01); *G06Q 20/00* (2013.01); *G06Q 30/0635* (2013.01); *G06Q 10/047* (2013.01)

(58) Field of Classification Search
CPC .......... A21B 1/52; A21C 1/00; B60P 3/0257; G05D 1/0088; G05D 1/0231; G05D 1/0257; G06Q 30/0635; G06Q 50/12; G06Q 10/047; G06Q 10/06315; G06Q 10/083
See application file for complete search history.

(56) References Cited

U.S. PATENT DOCUMENTS 4,632,836 A * 12/1986 Abbott ................... A21B 7/00
296/22
4,919,477 A * 4/1990 Bingham .............. B60P 3/0257
296/22

(Continued)

FOREIGN PATENT DOCUMENTS

JP   2005309977 A   11/2005

*Primary Examiner* — Peter Ludwig
*Assistant Examiner* — Avia Salman
(74) *Attorney, Agent, or Firm* — Bayromoglu Law Offices LLC (57) ABSTRACT

The present invention relates to a system in a vehicle which enables fully automatic preparation of pizza during delivery in order to deliver crisp pizza fresh out of the oven to the customers. The system carries out the process starting from the fermentation of the dough up to the cooking of the product in the vehicle automatically without using manpower. Delivery with optional autonomous driving characteristic is performed without a driver. Pizza delivery vehicles operating in real time with the back office and management application, calculates the cooking time by using the position information of the vehicle and times it such that the cooking process is completed when the vehicle arrives at the delivery destination. As a result, it is enabled for the pizzas cooked inside the stone oven within the vehicle to be delivered to the customers with quality such that they were cooked in a restaurant.

10 Claims, 6 Drawing Sheets

(51) Int. Cl.
*A21C 1/00* (2006.01)
*A21B 1/52* (2006.01)
*G06Q 10/06* (2012.01)
*G06Q 20/00* (2012.01)
*G06Q 10/04* (2012.01)

(56) References Cited

U.S. PATENT DOCUMENTS

| | | | | |
|---|---|---|---|---|
| 7,183,518 | B2* | 2/2007 | Near | A47J 36/321 |
| | | | | 219/214 |
| 8,276,505 | B2* | 10/2012 | Buehler | A23L 5/10 |
| | | | | 99/326 |
| 9,589,082 | B2* | 3/2017 | Ide | G01C 21/3617 |
| 2002/0048624 | A1 | 4/2002 | Blanchet et al. | |
| 2014/0370167 | A1* | 12/2014 | Garden | B60P 3/007 |
| | | | | 426/233 |
| 2015/0019354 | A1* | 1/2015 | Chan | A47J 37/00 |
| | | | | 705/15 |
| 2015/0088779 | A1* | 3/2015 | Falcone | G06Q 10/083 |
| | | | | 705/330 |
| 2015/0186981 | A1* | 7/2015 | Holman | G07F 9/002 |
| | | | | 705/26.9 |
| 2016/0162833 | A1 | 6/2016 | Garden | |
| 2017/0356983 | A1* | 12/2017 | Jeong | G02F 1/292 |

* cited by examiner

FULLY AUTOMATIC PIZZA, FLATBREAD, LAHMACUN ETC. PREPARATION AND DISTRIBUTION SYSTEM

CROSS REFERENCE TO RELATED APPLICATIONS

This application claims priority to Turkish application No. TR 2016/18011 filed on Dec. 7, 2016, the entire contents of which are incorporated herein by reference.

TECHNICAL FIELD

The invention subject to the application is related to a device which may contain an optional autonomous driving characteristic which enables to fully automatically prepare pizza and other similar pastry products in order for them to be freshly and crisply delivered to the customers.

BACKGROUND

The consumers, who order food to be delivered home, want their food to be delivered as fast as possible before the food gets cold. For this reason, food delivery vehicles, comprise ovens which enable the food to be heated or insulating containers which retain the temperature of the food. Besides these, distribution methods in which the food is prepared inside the vehicles are also known.

Vehicles in which products such as pizza are prepared during distribution are also known. As the cooking time of products such as pizza is between 3-5 minutes it is not a problem for such products to be cooked during their delivery. Examples in which products such as pizza are prepared during delivery with ingredients that have been stored beforehand in the vehicle are known in the state of the art.

The patent document with the number US2002048624A1 can be given as reference regarding this issue. Said document is related to a pizza preparation and delivery method comprising a freezer and oven which enables to cook pizzas during delivery thereof. In order to prepare pizza during delivery one more person is required besides the driver.

The patent document with the number JP2005309977(A) can be given as reference regarding this issue. Said document is related to a method which calculates the arrival time according to traffic in delivery vehicles and adjusts the starting time of the cooking process according to the information obtained. Accordingly, the control computer creates route according to the delivery vehicle information, and the arrival time is calculated according to the traffic information along said route. The starting time of the cooking process is submitted to the delivery vehicle for the product to be cooked inside the oven. Said prior art comprises a control computer, a freezer inside the delivery vehicle, an oven, a GPS, temperature sensors and a system by means of which customers can track down their orders. The pizza dough and ingredients are readily loaded onto the vehicle.

The patent document with the number US 2016/0162833 A1 can be given as reference regarding this issue. Said prior art, is related to a system which enables the automatic preparation of the pizzas during delivery. The system calculates the delivery time of the vehicle to the customer and enables the pizza inside the vehicle to be prepared autonomously in accordance with the preferences of the customer. The frozen pizza dough and pizza ingredients are loaded into the vehicle.

SUMMARY OF THE INVENTION

The invention subject to the application is related to a system in a pizza delivery vehicle which enables fully automatic preparation of pizza during delivery in order to deliver crisp pizza and other similar pastry products fresh out of the oven to the customers.

The system aims for products such as pizza, flatbread and lahmacun (Turkish flatbread with mince-meat) that are selected by the user, to be prepared automatically and to deliver said products fresh out of the oven to the customers.

The present invention aims to carry out the objects according to the aforementioned information and detailed descriptions below is related to a pizza delivery vehicle having an optional autonomous driving characteristic which enables to autonomously prepare the orders while the delivery vehicle is en route to the delivery destination. Said invention comprises a mobile terminal which enables for orders to be submitted to the dynamic pizza delivery vehicle, a payment terminal comprising a POS device which enables payment upon delivery and/or for payments to be collected online during the placement of an order, a dynamic pizza delivery vehicle which enables for the pizza to be prepared, cooked and delivered autonomously, a back office and management application which enables to control the pizza delivery process and operates the dynamic pizza delivery algorithm, a mobile application which enables the customers to place orders from portable devices, and a web application which enables customers to place orders via the internet.

The invention is different to the prior art, in that it enables to ferment the pizza dough and to cook and package the pizzas inside vehicle. By means of the optional autonomous driving characteristic, delivery is performed without a driver. In the prior art, the ready to cook pizza dough were loaded into the vehicle and were stored in the freezer. Moreover, the pizzas that are cooked inside the pizza vehicles having electric or gas ovens according to the prior art, do not provide the same taste as the pizzas cooked in restaurants. The invention comprises a mobile stone oven or a special IR oven which can provide stone oven taste.

According to a preferred embodiment of the invention, the system comprises a dynamic pizza delivery algorithm which calculates the estimated delivery time of the dynamic pizza delivery vehicle to the destination and carries out the pizza preparation and cooking procedures autonomously and controls the preparation, cooking and packaging process.

According to another embodiment of the invention, the dynamic pizza delivery vehicle comprises a section into which dough ingredients are placed, located at the rear section of the vehicle which enables to prepare, cook and pack pizza without man power, a dough mixing mixer which mixes the dough, a fermentation area in which the dough is fermented, a cooling storage area in which ingredients are stored, conveyor bands which enable the delivery of the product between devices, a dough spreading device which shapes the dough, a saucing machine which enables to add sauce to the dough to spread said sauce, a garnishing machine which garnishes the ingredients selected by the customer when they were placing the order, a stone oven or a mobile oven having equivalent characteristics to the stone oven which carries out the cooking procedure, a packaging and presentation machine which enables to package the final product and to serve it out of the system, an online system and/or a credit card slot enabling to receive payment, and an information screen positioned next to the credit card slot.

The preferred embodiment of the invention is characterized in that it can autonomously carry out the preparation and cooking process of products (lahmacun, flatbread etc.) having similar preparation techniques as pizza, by the dynamic pizza delivery vehicle without the need to use manpower. The automatic driving characteristic is provided optionally in the vehicle. By means of this characteristic, products such as lahmacun and flatbread are prepared using a technique similar to pizza preparation, automatically and are delivered autonomously to the destination without the need for a driver.

BRIEF DESCRIPTION OF THE DRAWINGS

The figures prepared in order to further describe the system which enables fully automatic preparation of pizza during delivery in order to deliver crisp pizza fresh out of the oven to the customers have been explained below.

The aspects, sections and parts shown in the figures which have been prepared in order to further describe the system which enables fully automatic preparation of pizza during delivery in order to deliver crisp pizza fresh out of the oven to the customers have each been numbered and the references of each number has been provided below.

1. Log-in information
2. Date
3. Time
4. Traffic and statistics
5. Traffic flow rate and statistics
6. Activity schedule en-route
7. Socioeconomic data of the region
8. Road works en-route
9. Flow statistics of traffic according to time
10. Arrival time
11. Alternative roads
12. The position and statistics of the present vehicles.
13. The number of free vehicles
14, The present situation of vehicles (free, being loaded, delivery stage)
15. Estimated arrival time for each vehicle
16. Geographical information system
17. Analysis and statistical section
18. Routes
19. Performance evaluation data
20. Continuous information update and corrections.
21. Dynamic pizza delivery algorithm
101. Smart phone application
102. Web application which enables on-line ordering.
103. Back office and management application
104. Determining suitable vehicles for deliveries
105. Mobile terminal
106. Pizza delivery process
107. Pizza preparation and cooking
108. Packaging and delivery
109. Payment terminal
110. Dynamic pizza delivery algorithm
201. Apparatus
202. Dough mixing machine
203. Dough fermentation area
204. Dough processing machine
205. Roller
206. Pizza preparation machine
207. Mobile stone oven cooking unit.
225. Dough ingredient
226. Conveyor band and/or other various delivery mechanisms.
301. Section into which dough ingredients are inserted
302. Dough mixer
303. Fermentation area
304. Conveyor band
305. Dough spreading device
306. Saucing machine
307. Garnishing machine
308. Mobile oven
309. Packaging and presentation machine
310. Credit card slot
311. Information screen
313. Radar
314. Lidar
315. Improved proximity sensors
316. Cooled storage
317. Industrial Central Processing Unit

DETAILED DESCRIPTION OF THE INVENTION

The invention subject to the application is related to a system in a vehicle which enables fully automatic preparation of pizza during delivery in order to deliver crisp pizza fresh out of the oven to the customers.

The system aims to deliver pizzas that have been freshly cooked, and that are hot and crisp to customers in a short period of time. In order for tasty pizzas to be prepared with high quality, the pizzas are cooked in a stone oven or in an IR oven which can provide the same taste as the stone oven and the cooking time ends when the delivery vehicle reaches the customer.

Figure 1:
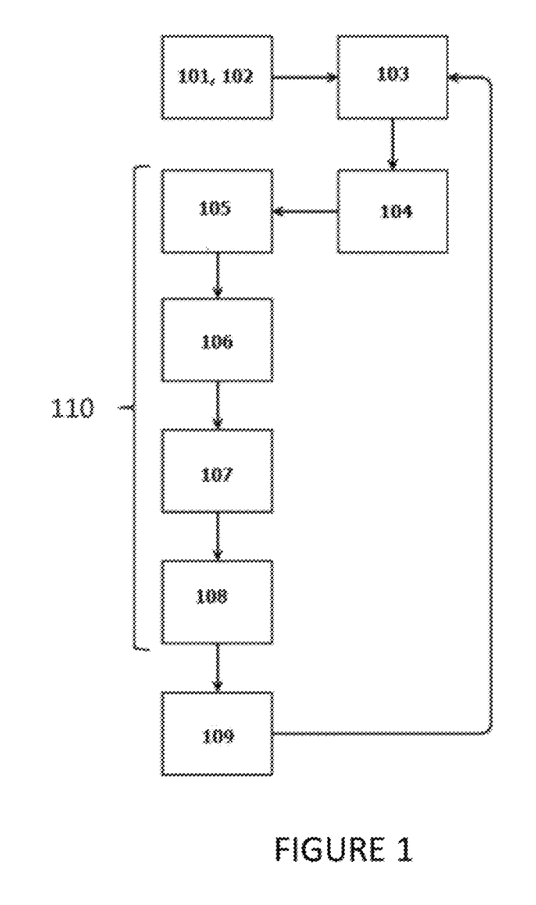
FIG. 1, shows the flow diagram of the operation manner of the components within the pizza delivery system in interaction with each other.

The fully automatic pizza delivery system shown in FIG. 1, has been designed such that 5 different components operate in connection with each other. The system comprises a mobile terminal (105), a payment terminal (109) including a POS device, a dynamic pizza vehicle (110) back office and management application (103), smart phone application (101) for customers and a web application (102) with which online orders can be received. A pizza order is taken via the web or mobile application (101, 102). The orders taken are submitted to the back office management application (103). The back office management application (103) selects (104) the vehicle suitable for delivery and submits the order to the mobile terminal (105). Following confirmation within the mobile terminal (105) located inside the dynamic pizza vehicle (110) the pizza delivery process (106) is started. The pizza preparation and cooking (107) procedures are started within the dynamic pizza delivery vehicle (110) during delivery. The ending of the pizza preparation and cooking procedures (107) before the dynamic pizza delivery vehicle (110) reaches its destination is planned by the back office application (103). The packaging and delivery (108) procedure is applied when the dynamic pizza delivery vehicle (110) reaches its destination. Following this information that the delivery and payment has been completed is submitted to the back office management application (103) following the payment by means of the payment terminal (109). The payment terminal (109) is such that payment can be carried out using smart phone applications such as iTunes and Uber and by means of a POS device.

All the necessary steps for pizza production are carried out during the delivery process of the dynamic pizza delivery vehicle (110). As it has been shown in FIG. 5, pizza production within the dynamic pizza vehicle (110) is carried out autonomously. The pizza delivery vehicle comprises an apparatus (201) which provides dough ingredients (225), a dough mixing machine (202), cooling air storage area (not shown in the figures) for fermented dough and pizza ingredients, dough processing machine (204) which enables to cut the dough, conveyor band and/or other various delivery mechanisms (226) which enable the delivery of pizza dough between such components, roller (205) which sauces the pizzas, pizza preparation machine (206) which garnishes the pizza according to the preferences of the customer, a mobile stone oven cooking unit (207) located inside the vehicle and a packaging machine (208).

The mobile terminal (105) is an interface with which orders are taken and confirmed. The mobile terminal is used in order to obtain location information via the modem and global positioning system (GPS) located therein. The mobile terminal connects to the smart phones and enables audio feedback.

The payments can be carried out with two options, such as upon, delivery and online (digital payment such as credit card, apply pay, pay pal etc.) during the placement of an order, A payment terminal (109) is provided which comprises a POS device that enables payment upon delivery following the delivery of the pizzas to customers. Payment can be carried out using a credit card. The payment information is transferred to the back office and management application via the mobile terminal.

Figure 2:
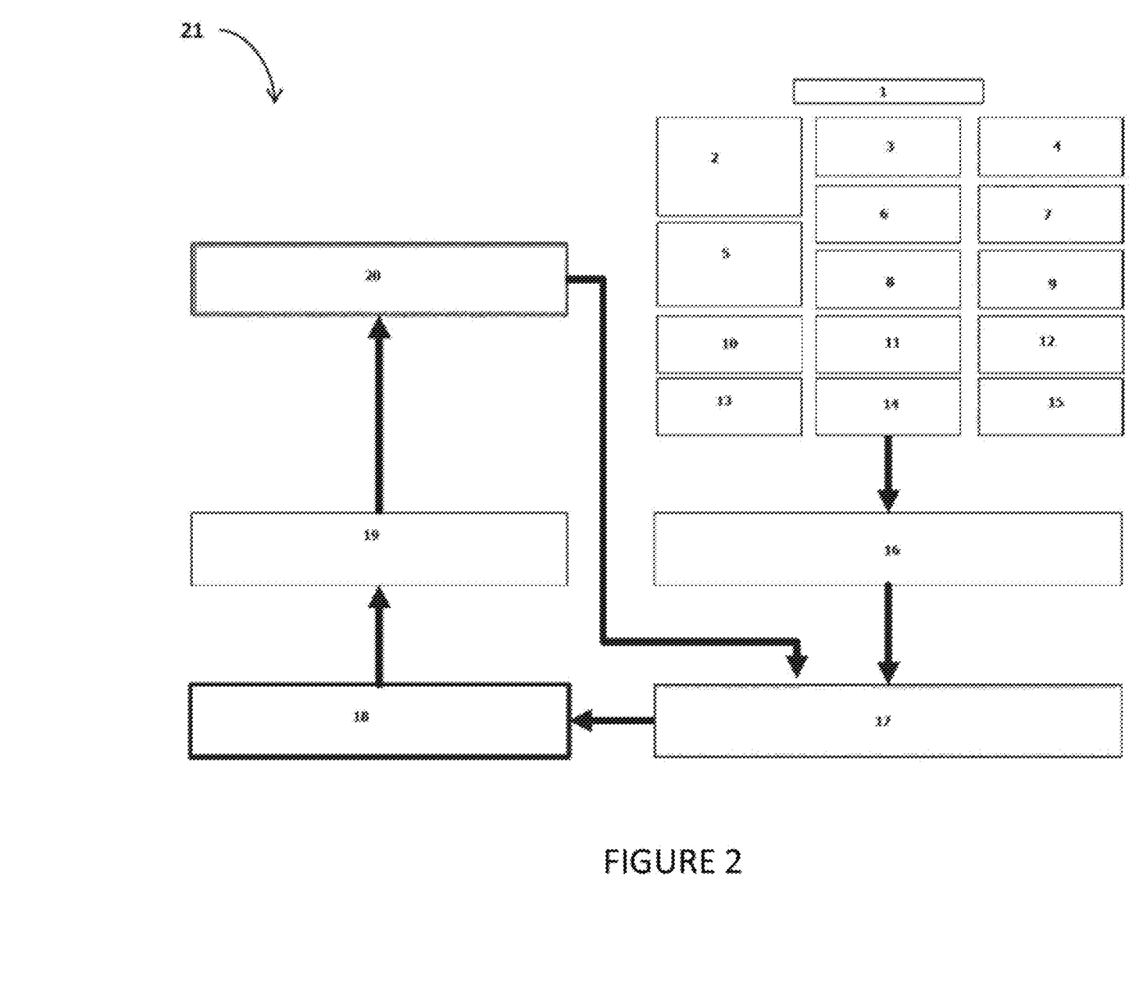
FIG. 2, shows the flow diagram of the software of the dynamic vehicle comprised in the pizza delivery system.

The back office and management application (103) optimizes the delivery time, using past and real time data by means of the dynamic pizza delivery algorithm (21). The component calculates with high precision the arrival time (10) including alternative routes (11) online via the Internet, using data such as date (2), time (3), traffic and statistics (4), traffic flow rate and statistics (5) activity schedule en-route (6), Socioeconomic data of the region (7), road works en-route (8) and flow statistics of traffic according to time (9) The component uses the positions and statistics (12) of present vehicles, the number of free vehicles (13) the present condition of vehicles (14) (free, being loaded, at the delivery stage), the estimated arrival time (15) as log-in information (1). The log-in information package (1) obtained, is passed through the geographical information system (16) and the information is then submitted to the pizza delivery algorithm analysis and statistics section (17). The fastest delivery routes (18) obtained by the information that is evaluated via artificial intelligence are delivered to dynamic pizza delivery vehicles (110). The information submitted to dynamic pizza delivery vehicles and the real situation is continuously compared and as a result performance evaluation data (19) is obtained Within this scope, continuous information updating and corrections (20) are carried out and the information is re-submitted to the pizza distribution algorithm analysis and statistics section (17) and therefore a cycle is created.

Figure 3:
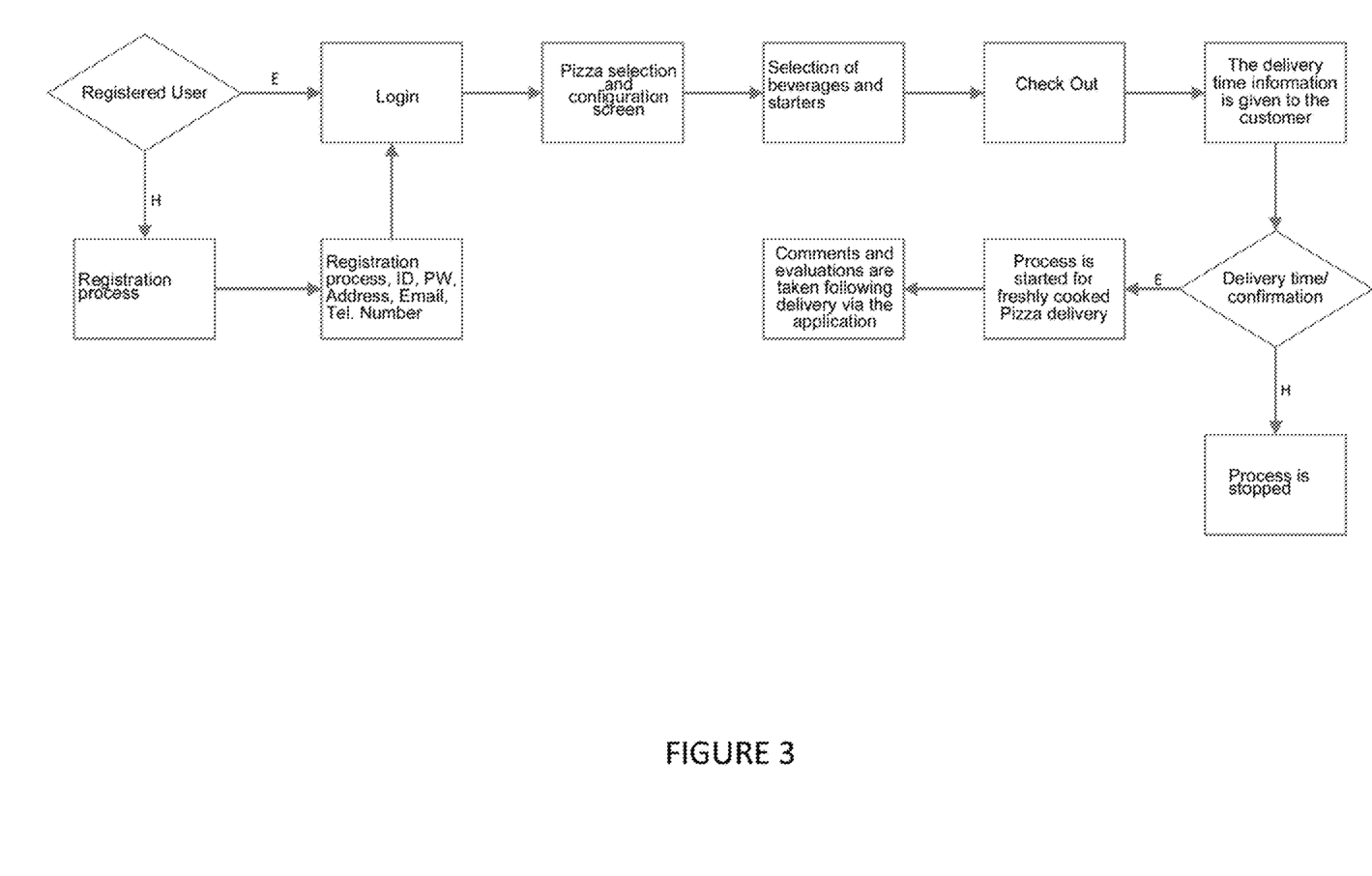
FIG. 3 shows the floc diagram of the mobile application component within the pizza delivery system.

The pizza orders are given via the web page using smart phone applications. Mobile application order flow schedule is described in FIG. 3. The membership screen of the mobile application interface initially greets the user. If the membership is confirmed, the user is directed to the login screen, and if the membership is not confirmed, the user information obtained and then the member is directed to the login screen. Following the login process, the screen from which pizza can be selected is shown. The user can then select the pizza according to any of the ingredients defined by the back office and management application, and following this the user can then select drinks or other starters/appetizers and then continue to the payment screen. Following the payment screen the position and address information is inputted and the system calculates the estimated delivery time and the information is provided to the user to be confirmed, and after this step, the pizza delivery step is started. The comments and scoring regarding the delivery of the pizza can be optionally provided by the mobile application. When the delivery time of the orders is not confirmed by the customer, said orders are cancelled.

Figure 4:
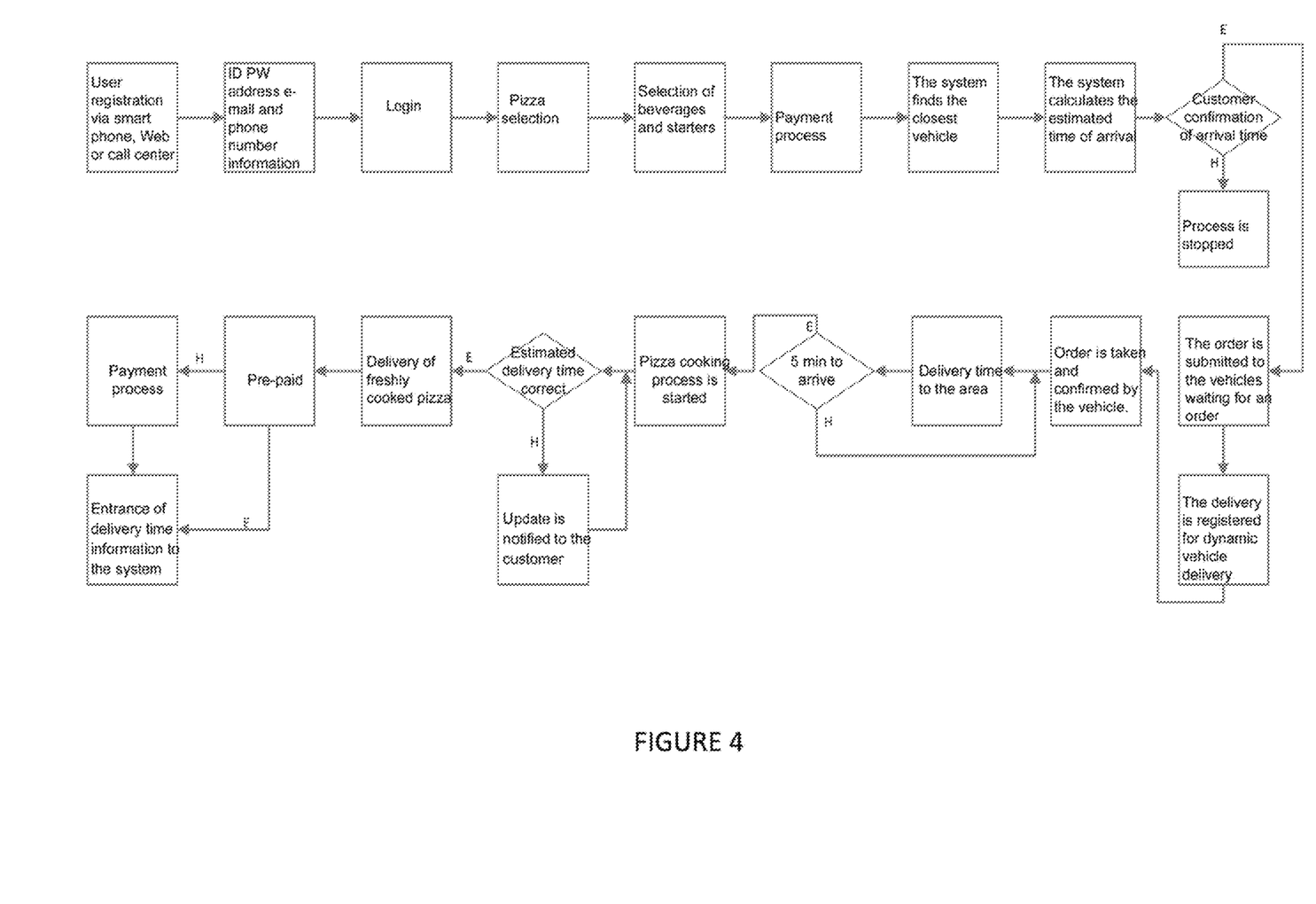
FIG. 4 shows the flow diagram of the web application component within the pizza delivery system.

FIG. 4 explains the web application. In the web interface the user is greeted by the record and call centre page. After the user information is recorded the user can log in to the system. Following the selection of pizza, the sauce and drinks the user is directed to the payment screen. The back office and management application within the system detects the closest delivery vehicle during the completion of the payment processes on the payment screen, and the system calculates the estimated time of delivery according to the determined route. When the user confirms the delivery time, the orders are evaluated by the back office and management application and the routes are updated for the dynamic pizza delivery vehicles which are suitable for delivery. The pizza cooking procedure must start 5 minutes before delivery to destination in dynamic pizza delivery vehicles. The pizza cooking process continues until the dynamic pizza delivery vehicle reaches the destination via controlling of the arrival time. Within this scope the dynamic pizza delivery vehicle continuously checks if the delivery time is less than 5 minutes and if the result is positive the cooking process is initialized. In the case that the estimated delivery time cannot be reached the pizza delivery vehicle informs the customer via the back office and management application. When the pizza is delivered to the customer, the payment is transferred and the actual delivery time is recorded.

Figure 5:
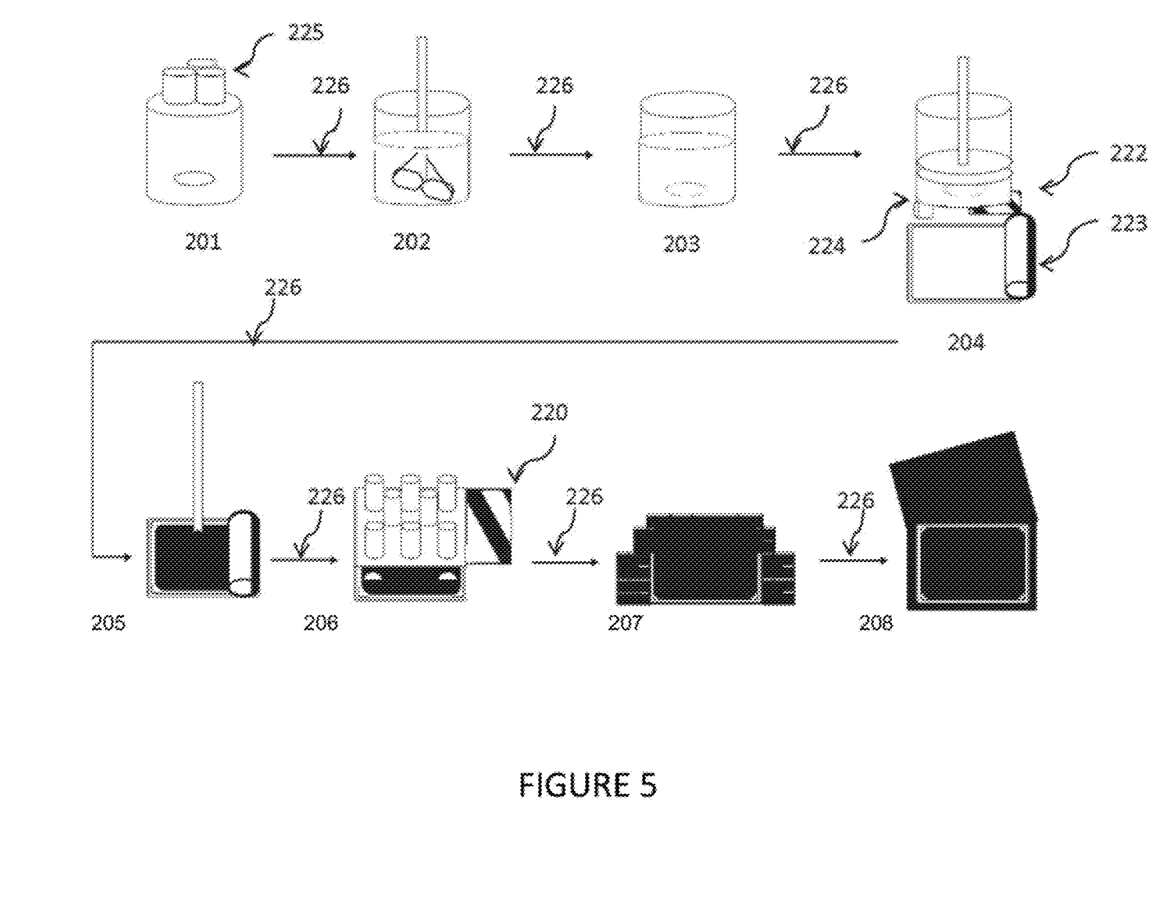
FIG. 5 shows the flow diagram of the pizza preparation process carried out within the dynamic pizza delivery vehicles located in the pizza delivery system.
Figure 6:
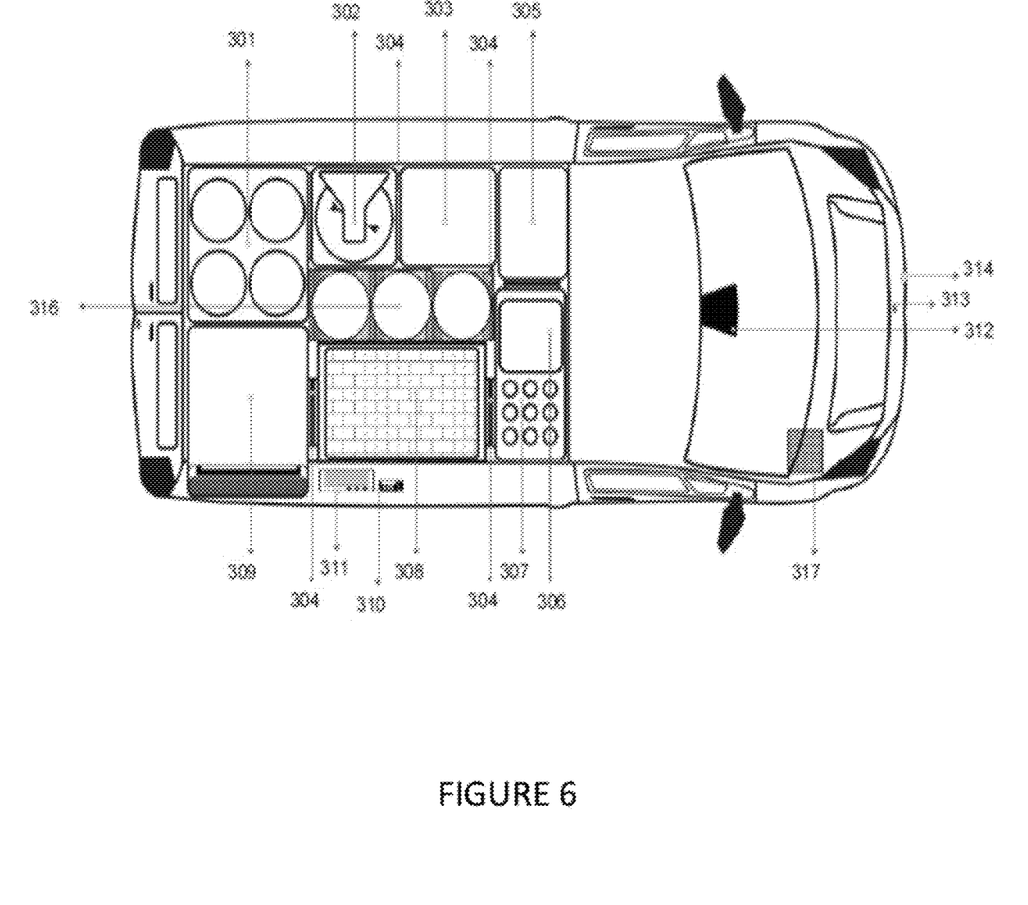
FIG. 6 shows the pizza preparation devices located inside the pizza delivery vehicle and the positioning of the autonomous driving sensors.

FIG. 5 describes the dough preparation and cooking procedure. The preparation of the dough in dynamic pizza delivery vehicles (110) is carried out independent from the pizza order, in one go, in accordance with the daily sales target, and the pizza dough is stored inside the cold storage cabinet (not shown in the figures) located inside the dynamic pizza delivery vehicle (110). The dough preparation procedure, comprises the steps taken between the additions of the dough ingredients (225) by the dough ingredient addition apparatus (201) and the cutting of the dough by the dough processing machine (204). The pizza dough may be delivered to the cold storage cabinet (not shown in the figures) after the process following the process taken by the dough processing machine (204) or the dough can be delivered via the conveyor band (226) to the oven for the pizza to be prepared and cooked. The sauce required for the pizza and the pizza ingredients are obtained externally and are stored in the cold storage cabinet in accordance with the daily sales target. The sauce and other ingredients are loaded to the vehicle on daily basis. The fermentation of the pizza dough, its cutting, preparation and cooking procedures are carried out automatically according to the commands received from the back office application, after the order has been taken. The vehicle optionally comprises an "autonomous driving" characteristic. By means of this characteristic, the vehicle is automatically driven to the destination and the freshly baked pizza or other similar pastry products are delivered to the customer automatically, and the vehicle continues to its next destination. The embedded industrial central processing unit (317) of the vehicle processes the information received from the improved video analysis camera and GPS (312), high precision Lidar (314) which carries out area and position scanning, radars (313) which can detect objects, and it enables for the vehicle to reach its next destination by processing the information received from the proximity sensors located on the front and rear bumpers of the vehicle. The back office and management application (103) located in the system has a computer system which is intelligent. The intelligent computer system can improve itself continuously by continuously improving delivery times dynamically. The fastest delivery routes obtained by the information that is evaluated via artificial intelligence are submitted to dynamic pizza delivery vehicles (110).

The invention claimed is:

1. A fully automatic pizza preparation, cooking and delivery system comprising:
   an autonomous driving dynamic pizza delivery vehicle comprising an interior, where the interior of the autonomous driving dynamic pizza delivery vehicle contains
      an apparatus storing dough ingredients and located at a rear section of the vehicle;
      a dough mixing machine configured to mix added dough ingredients;
      a dough fermentation area configured to ferment a dough mixture by leaving the dough to wait for a predetermined period of time;
         a cold storage cabinet configured to store a fermented dough, and pizza ingredients in a healthy manner;
         a dough processing machine configured to cut the dough in desired geometrical shapes;
         a mobile stone oven cooking unit for cooking the dough to form a pizza;
         a garnishing machine configured to garnish the pizza according to preferences of a customer;
         a roller configured to spread a sauce on the pizza;
         a packaging machine configured to pack the pizza;
         a delivery mechanism including a plurality of conveyor belts configured to deliver the dough between the dough fermentation area, the cold storage cabinet, the dough processing machine, the mobile stone oven cooking unit, the pizza preparation machine, the roller and the packaging machine; and
      a mobile terminal configured to receive an order
   and wherein the fully automatic pizza preparation, cooking and delivery system further comprises the following to deliver the pizza
   a mobile application which enables customers to place orders from portable devices;
   a web application which enables the customers to place the orders via an internet; and
   a payment terminal configured to receive a payment of the order online or via a card, wherein the orders are submitted to a back office and management application which is configured to control a pizza delivery process and operate a dynamic pizza delivery algorithm and when the autonomous driving dynamic pizza delivery vehicle obtains confirmation of the orders from the mobile terminal, the autonomous driving dynamic pizza delivery vehicle continuously checks if a delivery time is less than five minutes and when the delivery time is less than the five minutes, pizza preparation and cooking procedures are initialized in the autonomous driving dynamic pizza delivery vehicle, where the autonomous driving dynamic pizza delivery vehicle prepares, cooks and delivers the pizza to the customer autonomously.

2. The system according to claim 1, wherein the dynamic pizza delivery algorithm calculates an estimated delivery time of the autonomous driving dynamic pizza delivery vehicle to a destination and carries out the pizza preparation and cooking procedures autonomously and controls a preparation, cooking and packaging process.

3. The system according to claim 1, further comprising an autonomous driving characteristic comprising:
   a Lidar which carries out high precision area and position scanning via the autonomous driving dynamic pizza delivery vehicle;
   a radar which detects objects around a vicinity of the autonomous driving dynamic pizza delivery vehicle;
   long distance proximity sensors that have been positioned onto front and rear bumpers of the autonomous driving dynamic pizza delivery vehicle; and
   an industrial central processing unit in which the system is operated.

4. The system according to claim 1, wherein the autonomous driving dynamic pizza delivery vehicle enables the autonomous driving dynamic pizza delivery vehicle to operate without a driver.

5. The system according to claim 1, wherein the autonomous driving dynamic pizza delivery vehicle is for a single person.

6. The system according to claim 1, wherein the autonomous driving dynamic pizza delivery vehicle further comprises:
   a credit card slot enabling to receive the payment; and
   an information screen positioned next to the credit card slot.

7. The system according to claim 1, further comprising:
   a computer system, wherein the computer system continues to learn via artificial intelligence,
      wherein the back office and management application continues to improve delivery times dynamically and continuously and re-submits calculated delivery route information received from the autonomous driving dynamic pizza delivery vehicle back to the autonomous driving dynamic pizza delivery vehicle.

8. The system according to claim 1, wherein the back office and management application detects a closest dynamic pizza delivery vehicle during completion of the payment on a payment screen.

9. The system according to claim 1, wherein preparation of the dough in the autonomous driving dynamic pizza delivery vehicle is performed independent from the order and in accordance with a daily sales target.

10. The system according to claim 1, wherein the fermentation of the dough, cutting the dough, and preparation and cooking procedures are carried out automatically according to commands received from the back office and management application, after the order has been taken.

* * * * *